US007007340B1

(12) United States Patent
James

(10) Patent No.: US 7,007,340 B1
(45) Date of Patent: Mar. 7, 2006

(54) WATER-DIVERTING WINDSHIELD WIPER BLADES

(76) Inventor: Albert J. James, 1109 Heather Island La., Seabrook Island, SC (US) 29455

( * ) Notice: Subject to any disclaimer, the term of this patent is extended or adjusted under 35 U.S.C. 154(b) by 0 days.

(21) Appl. No.: 10/635,853

(22) Filed: Aug. 5, 2003

Related U.S. Application Data

(63) Continuation-in-part of application No. 09/714,880, filed on Nov. 16, 2000, now Pat. No. 6,618,895, which is a continuation-in-part of application No. 09/631,071, filed on Aug. 2, 2000, now abandoned.

(51) Int. Cl.
*B60S 1/38* (2006.01)
(52) U.S. Cl. .................. 15/250.41; 15/250.48
(58) Field of Classification Search ............ 15/250.41, 15/250.4, 250.48, 250.04, 250.02, 250.01, 15/250.05, 250.07, 250.361, 250.09; 134/6
See application file for complete search history.

(56) References Cited

U.S. PATENT DOCUMENTS

| | | | |
|---|---|---|---|
| 1,370,910 A | | 3/1921 | Pederson |
| 1,441,593 A | | 1/1923 | Lavictcs |
| 1,641,392 A | * | 9/1927 | Lippert .................. 74/323 |
| 1,678,688 A | | 7/1928 | Zaiger |
| 1,725,405 A | | 8/1929 | McConnell |
| 2,908,028 A | | 10/1959 | Runton et al. |
| 3,916,473 A | | 11/1975 | Williams |
| 4,164,802 A | | 8/1979 | Rouse |
| 4,339,839 A | | 7/1982 | Knights |
| 4,567,621 A | | 2/1986 | Alley, Jr. |
| 4,616,060 A | | 10/1986 | Killgoar, Jr. |
| 4,723,336 A | | 2/1988 | Nakayama |
| 4,745,653 A | | 5/1988 | Bliznak |
| 5,168,595 A | | 12/1992 | Naylor, Jr. |
| 6,618,895 B1 | * | 9/2003 | James .................. 15/250.41 |

FOREIGN PATENT DOCUMENTS

DE        3644693      *   6/1988

(Continued)

*Primary Examiner*—Gary K. Graham
(74) *Attorney, Agent, or Firm*—Cantor Colburn LLP

(57) ABSTRACT

A wiper (22) has a length (L) which is divided into a distal segment (D), a middle segment (M) and a proximal segment (P). Wiper (22) has first and second wiper blades (26, 28), each having wiping faces (26c, 28c) in contact with a surface S and defining therebetween a channel (30). One or both of the blades (26, 28) have one-way water-passage formations thereon along the middle segment (M) of the length (L) thereof. Such formations, e.g., notches (34,36), are dimensioned and configured to permit passage of water through, e.g., the second blade (28), to the channel (30) when the second blade (28) is moving in a first direction, and to prevent passage of water through notches (34) when the second blade is moving in a second direction opposite to the first direction. Conversely, the first blade (26) formations, e.g., notches (34), permit water to pass through the formations when the first blade (26) is moving in the second direction and to prevent passage of water therethrough when the first blade is moving in the first direction. At least one intermediate blade (27) may be disposed between the first and second blades (26, 28) to divide the channel (30) into a first course (30*a*) and a second course (30*b*). A method of wiping a surface (S) includes controlled entry of water into the channel (30) and expulsion of water from the distal end (42) of the channel, assisted by a Venturi Effect and centrifugal force.

14 Claims, 9 Drawing Sheets

| | FOREIGN PATENT DOCUMENTS | | | JP | 63-258243 A | 10/1988 |
|----|----|----|----|----|----|----|
| FR | 854122 | * | 4/1940 | JP | 404078642 A | 3/1992 |
| FR | 2373426 | * | 7/1978 | JP | 179349 | 6/1994 |
| FR | 2420460 | * | 10/1979 | | | |
| GB | 1316781 | * | 5/1973 | * cited by examiner | | |

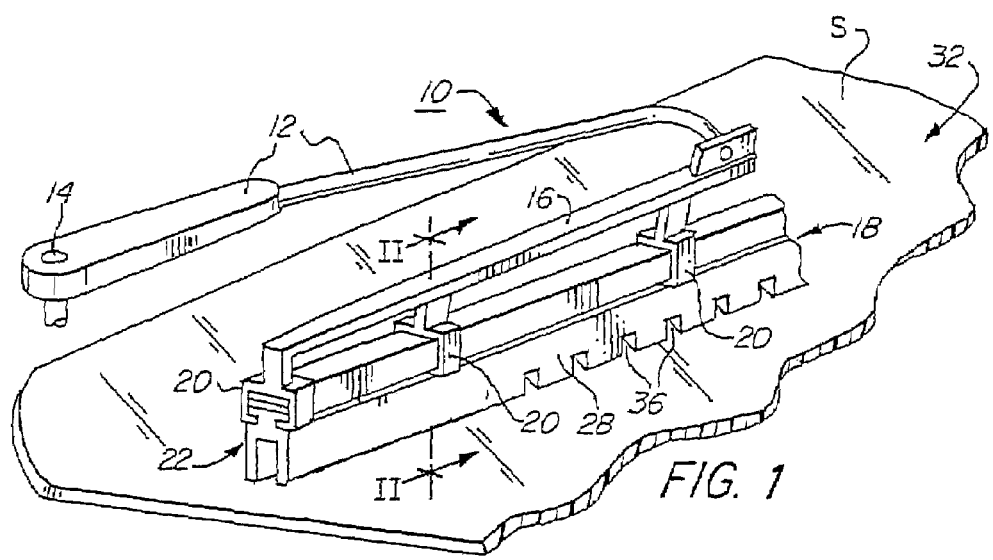
FIG. 1
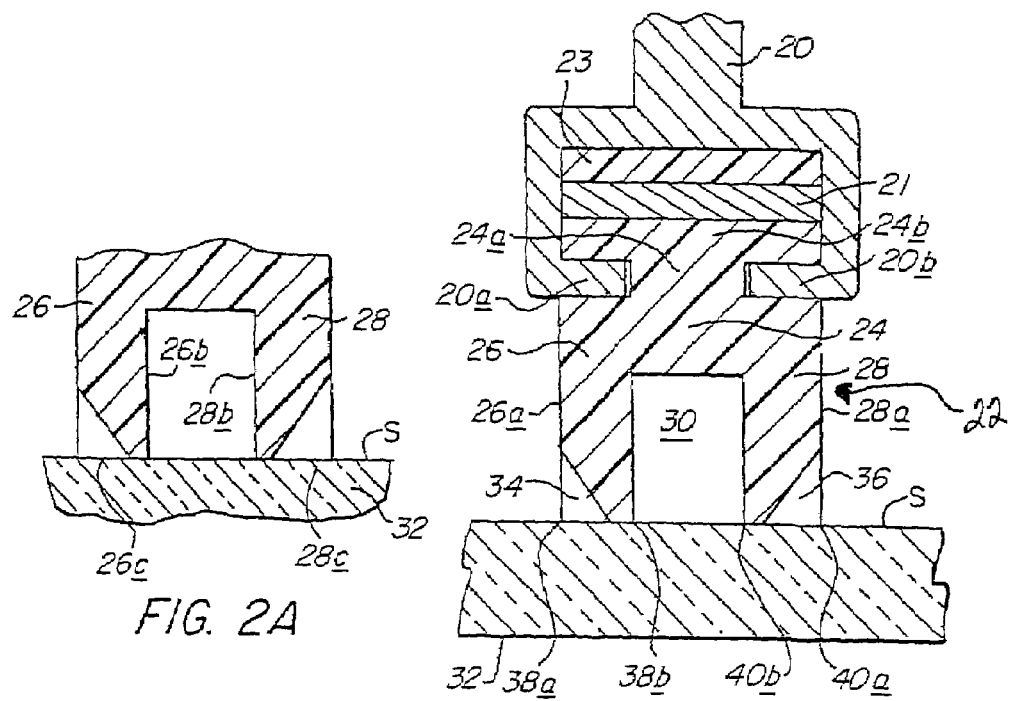
FIG. 2A
FIG. 2

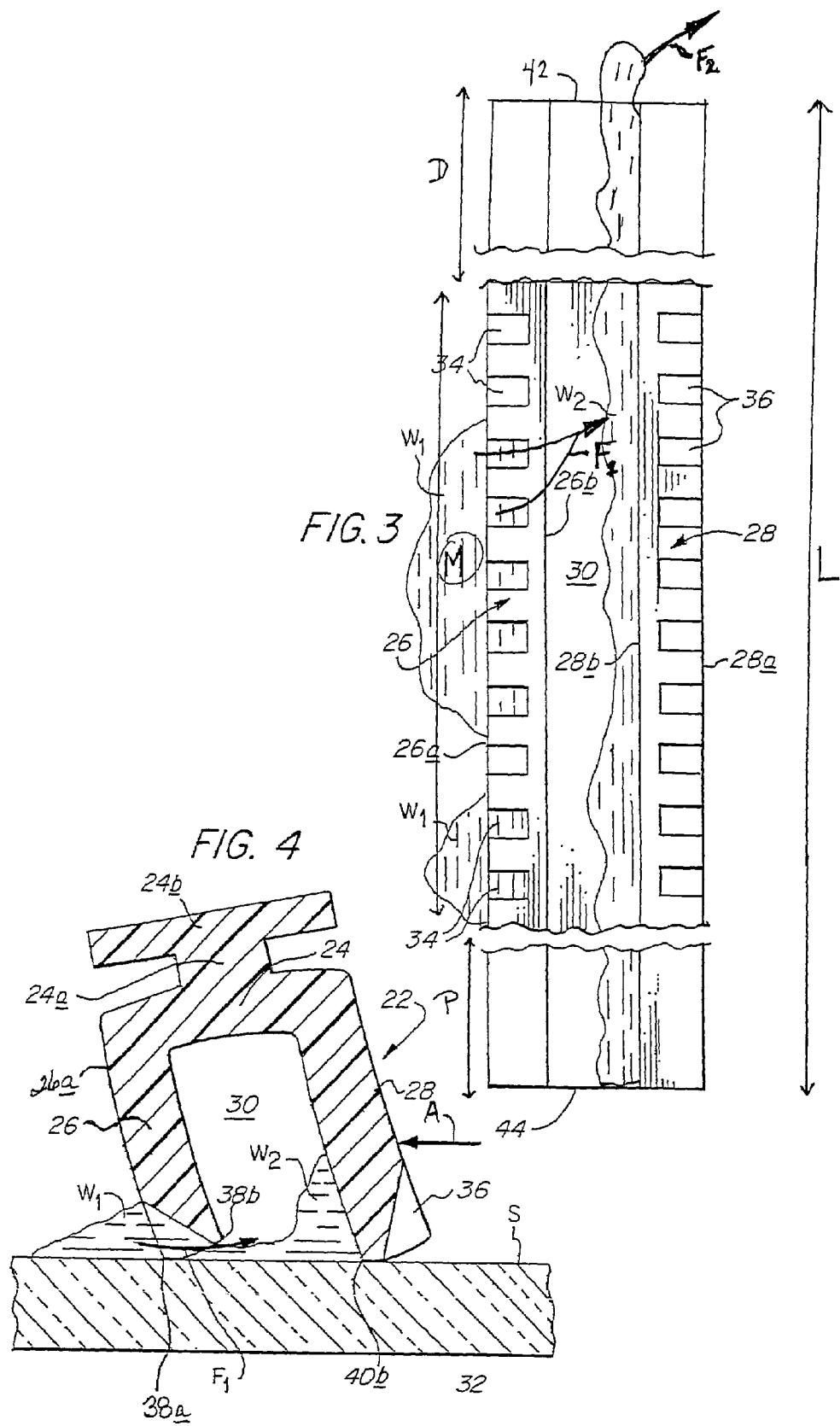

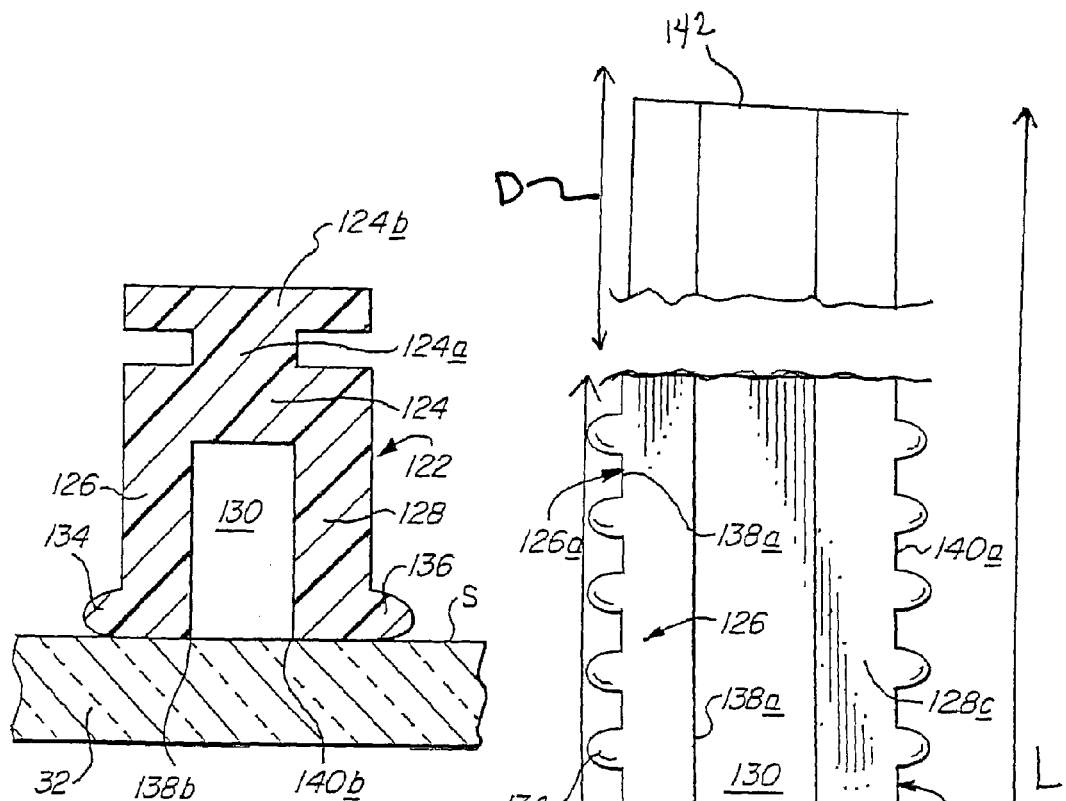
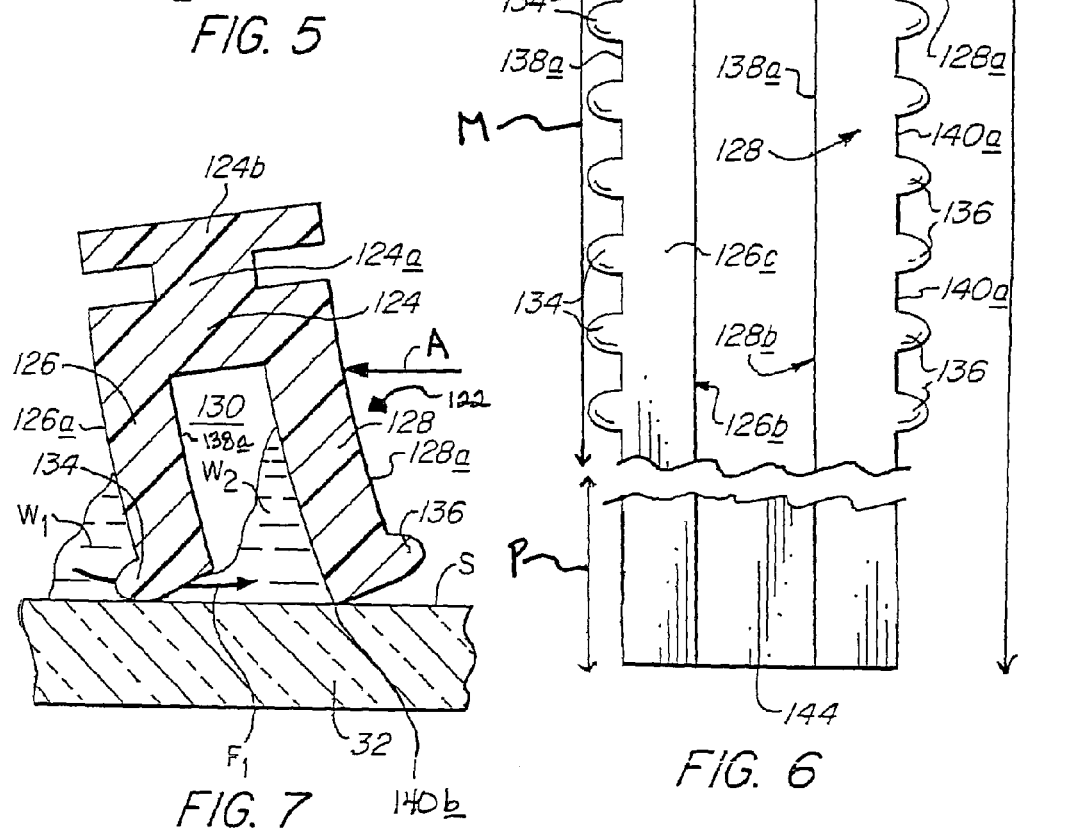
FIG. 5
FIG. 6
FIG. 7

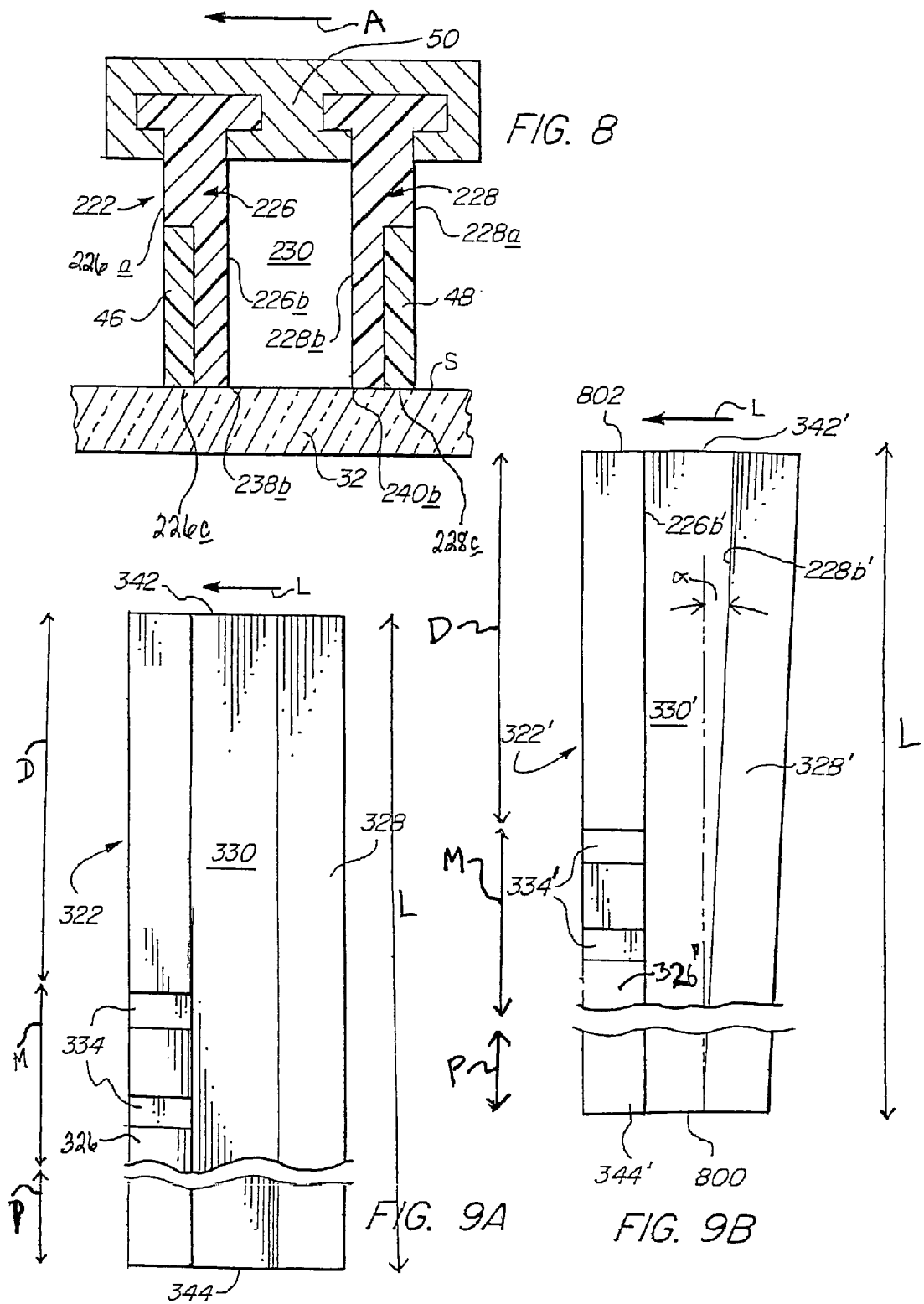

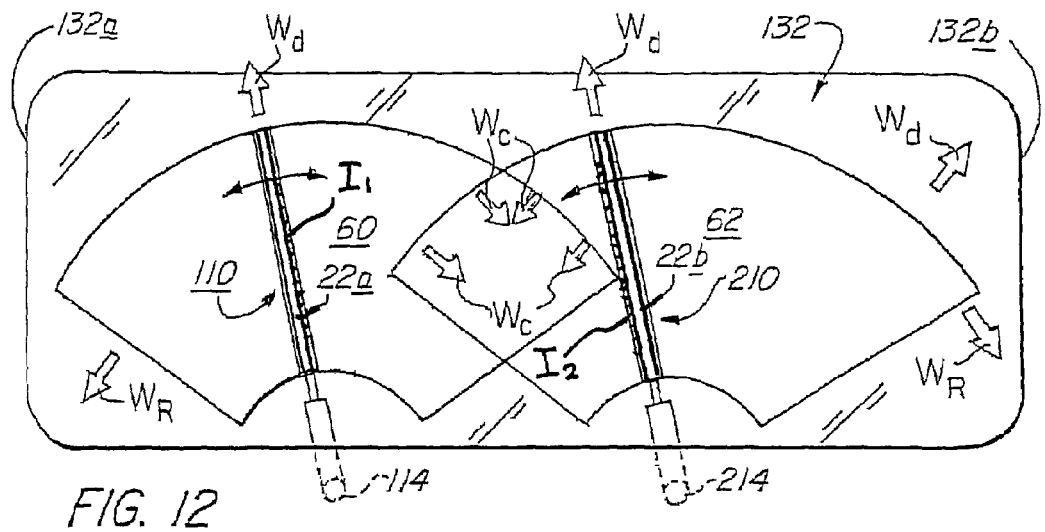
FIG. 12
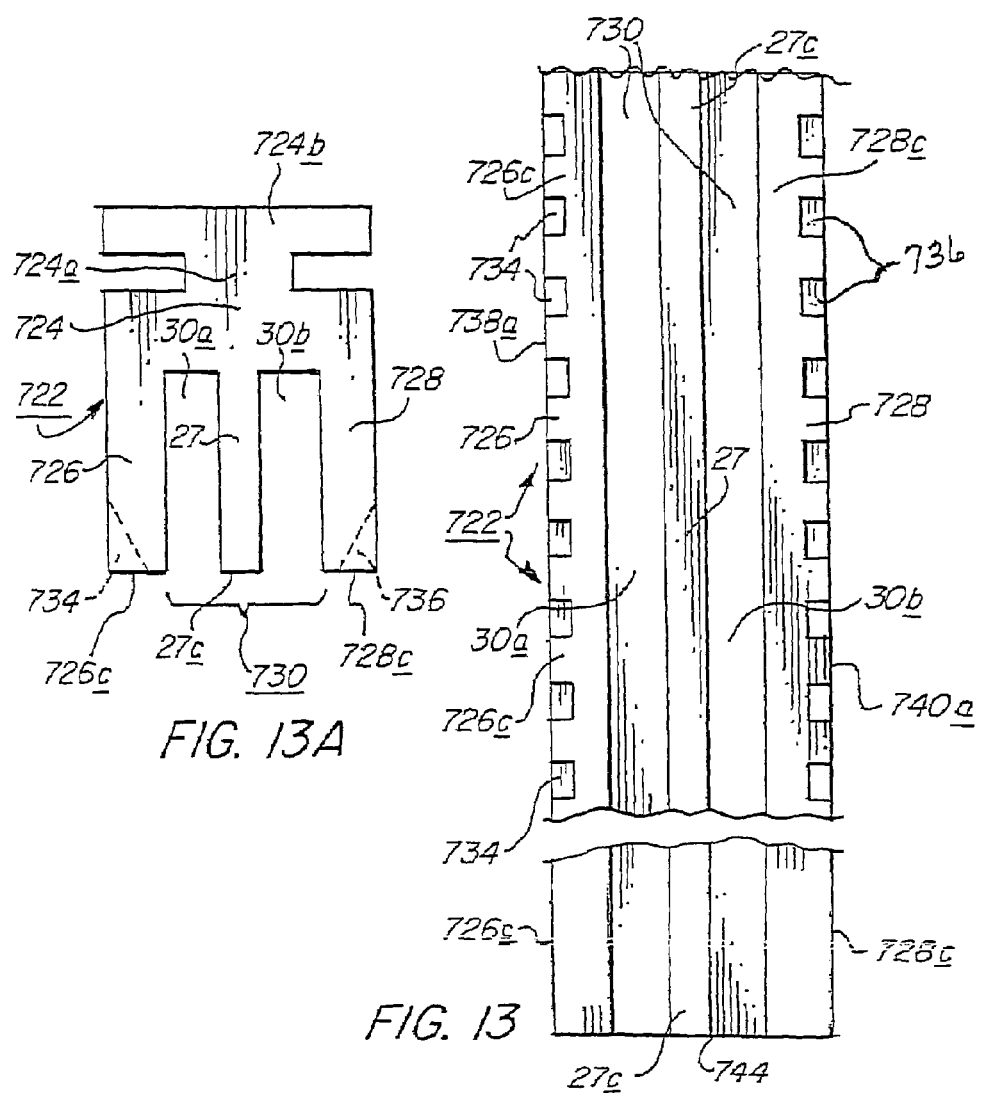
FIG. 13A
FIG. 13

WATER-DIVERTING WINDSHIELD WIPER BLADES

CROSS-REFERENCE TO RELATED APPLICATIONS

This application is a continuation-in-part of application Ser. No. 09/714,880, filed Nov. 16, 2000, in the name of Albert J. James and entitled "Water-Diverting Windshield Wiper Blades", now U.S. Pat. No. 6,618,895, which is a continuation-in-part of application Ser. No. 09/631,071, filed Aug. 2, 2000, in the name of Albert J. James and entitled "Water-Diverting Windshield Wiper and Method of Use", which has been abandoned.

BACKGROUND OF THE INVENTION

1. Field of the Invention

This invention relates generally to reciprocating wipers, e.g., windshield wipers, and, specifically, to windshield wipers having two or more blades which have formations therein which permit flow of liquid, e.g., water, through the blades in one direction of movement of the wiper, but not in the other.

2. Related Art

Known wipers usually comprise one or more resilient rubber blades mounted on an arm which reciprocatingly sweeps the blades sideways across the surface of a window, vehicle windshield, headlight lens or other formation. As the blades move across the surface, they push water or other liquids on the surface sideways until the arm reaches the limit of its travel, discharging an accumulation of water at the point where the arm stops and reverses its motion. The result is a fan-shaped cleared arc on the surface which is swept clear of water, at least temporarily. In a typical vehicle or aircraft windshield arrangement, there are two reciprocating windshield wiper assemblies, one for the driver or pilot and one for the passenger or co-pilot. One difficulty with this arrangement is that each reciprocating wiper assembly at the "inside" end of its travel path pushes some or all of the water it has cleared into the cleared arc of the adjacent wiper assembly. (The "inside" end of the travel path of the wiper assembly is the end of its travel which is adjacent to or overlaps the cleared area of the adjacent wiper assembly.) The accumulated water pushed into the cleared arc of the adjacent assembly reduces visibility through a windshield or the like and, especially on the driver's or pilot's side, presents a hazard. Removal of the accumulated, pushed water from the windshield is accomplished only when the accumulated water runs off the bottom and sides of the windshield or, in moving vehicles, is pushed off the upper edge of the windshield by aerodynamic pressure. The consequent reduction in visibility can be significant, especially in very heavy downpours of rain.

It is well known in the art to provide two or more parallel wiper blades on a single wiper arm to increase the efficiency of the wiping action, as shown by the following patents.

U.S. Pat. No. 5,168,595, issued to James L. Naylor, Jr. on Dec. 8, 1992 and entitled "Windshield Wiper Blade and Assembly", discloses one such system. A single wiper arm assembly 20 (shown in FIGS. 1 through 7) has an elongated blade carrier assembly 36 pivotally mounted to the arm 24, and first and second blades 26 and 27 mounted on the blade carrier assembly 36.

U.S. Pat. No. 4,745,653, issued to Bedrich V. Bliznak on May 24, 1988 and entitled "Wiper/Scraper/Washer Blade for Windows on Transportation Means", discloses a multiple-edged blade 1 (shown in FIG. 1) having two blades of different cross sections in contact with the surface to be cleaned, the smooth blades having a serrated appearance in cross-sectional view.

U.S. Pat. No. 4,567,621, issued to Robert L. Alley, Jr. on Feb. 4, 1986 and entitled "Composite Windshield Wiper Assembly", discloses a wiper blade assembly A (shown in FIG. 1) having a pair of spaced wiper blade elements 42, 44 having thin resilient wiping edges 42a, 44a. A scrubbing block 50 occupies the entire space between the wiping blade elements and protrudes at 52 past the wiping edges 42a, 44a.

U.S. Pat. No. 4,339,839, issued to Robert E. Knights on Jul. 20, 1982 and entitled "Windscreen Wipers", discloses (see FIG. 1) a windscreen wiper having a pair of spaced parallel wiping lips 22 bounding a space 28 in which is a bristle 32.

U.S. Pat. No. 3,916,473, issued to Zelmer L. Williams on Nov. 4, 1975 and entitled "Wiper for Windshields", discloses (see FIG. 6) a single longitudinal blade 38 provided with a longitudinal groove 40 running substantially the length of the blade 38. An aperture 42 in the blade base 36 permits feed of a fluid, such as windshield washer fluid, to the groove 40, from whence it flows to the windshield via passages 72 which run from the base 36 of the blade to the windshield.

U.S. Pat. No. 1,441,593, issued to Harry L. Lavietes on Jan. 9, 1923 and entitled "Windshield Cleaner", discloses a windshield wiper (see FIG. 1) having multiple strips 16 held in a pair of longitudinal grooves 15.

U.S. Pat. No. 1,370,910, issued to Julius Pederson on Mar. 8, 1921 and entitled "Windshield Cleaner", discloses in FIG. 1 a windshield cleaner having wiper strips 11 held in channels 16 of wiper bar 10.

French Patent 2,373,426 issued to Heuliez, discloses in FIG. 4 dual-blade windshield wipers designed to move horizontally across a windshield in linear, parallel movement.

SUMMARY OF THE INVENTION

Generally, the present invention provides a wiper, e.g., a windshield wiper, comprising two or more blades, e.g., a first blade and a second blade, disposed relative to each other so that, at least when the wiper is in use, the blades define therebetween a longitudinal channel which is open at its distal end and, preferably, is also open at its proximal end. Each blade is considered to comprise a middle segment disposed between a proximal segment and a distal segment, and at least one, but preferably both, of the blades have one or more formations, such as notches, slits or protrusions, disposed along a middle segment of the blade or blades and excluded from at least the distal segment of the blade or blades. The formations are configured so that as the blade is moved in reciprocating fashion across a surface, e.g., across the surface of a windshield, water (or other liquid) on the surface passes through the formations and under the blade when the wiper is moving in one direction, so that the water or other liquid may flow through the longitudinal channel and be discharged at one or both ends of the wiper, but does not pass through the formations, and is thereby wiped by the blade, when the wiper is moving in the opposite direction. The discharge of the water or other liquid is believed to be facilitated by a combination of Venturi and centrifugal force effects because the distal end of the wiper is moving faster than the proximal end through the typical arc-shaped travel path of the wiper. At least the distal and, preferably, both the proximal and distal, segments of the blade or blades are left free of formations which would permit water or other liquid to flow through the blade, because it has been found that the efficiency of liquid removal by the wiper is increased by doing so.

The present invention thus provides a dual or multi-blade wiper for a windshield wiper assembly or the like which provides controlled passage of water through at least one of the blades, i.e., which permits such passage of water through the blade when the blade moves in one direction but not when the blade moves in the opposite direction. If the formations are provided on more than one blade, e.g., on both blades of a dual-blade wiper, the formations are dimensioned and configured so that water passes through the leading blade and into and through the channel between the blades, but cannot pass through the formations in the trailing blade. In this fashion, water is trapped within the channel and expelled from an open end of the channel. (In all cases, "leading" and "trailing" are used relative to the direction of movement of the wiper. Accordingly, the leading and trailing blades cyclically reverse roles as the wiper reciprocates.)

Generally, if only one of the paired blades has water-passage formations therein, the blade closest to the other wiper assembly (i.e., the inside blade) is the one which should have the formations. If two wiper assemblies are used side-by-side as is the conventional arrangement, and only one of the wiper assemblies is equipped with a wiper in accordance with the present invention, the wiper of the present invention is preferably used as the passenger- or co-pilot-side wiper assembly rather than a driver- or pilot-side assembly. This is because it is more important not to push water into the driver's or pilot's cleared area. Obviously, especially in the case of an aircraft, it is preferable that both side-by-side wiper assemblies be equipped with wipers in accordance with the present invention. Such an arrangement reduces the degree to which water will be deposited by one wiper assembly on the region previously wiped by the adjacent windshield wiper assembly. The above-mentioned "inside" blade is described in more detail below in the description of FIG. 12 and is defined in some of the claims as the "first" blade.

BRIEF DESCRIPTION OF THE DRAWINGS

FIG. 1 is a partial perspective view, with parts broken away, of a wiper arm assembly including a dual-blade wiper in accordance with one embodiment of the present invention, the wiper being shown in contact with the exterior surface of a windshield;

FIG. 2 is a transverse cross-sectional view taken along line II—II of FIG. 1;

FIG. 2A is a partial view of the lowermost portion of the wiper of FIG. 2;

FIG. 3 is a bottom view of the wiper of FIG. 1, with an intermediate portion thereof broken away, as viewed from the interior of the windshield of FIG. 1 but with the wiper in motion to illustrate water flowing through the leading blade into and through the channel formed between the two blades;

FIG. 4 is a transverse cross-sectional view, corresponding to that of FIG. 2, but with parts omitted to show only the wiper in motion to illustrate the flow of water through the leading blade and into the channel formed between the blades;

FIG. 5 is a transverse cross-sectional view, corresponding to that of FIG. 4, of a wiper in accordance with a second embodiment of the present invention;

FIG. 6 is a bottom view of the wiper of FIG. 5, with an intermediate portion thereof broken away, viewed from the interior of the windshield of FIG. 5;

FIG. 7 is a view corresponding to that of FIG. 5 but showing the wiper in motion to illustrate the flow of water through the first blade and into the channel defined between the blades;

FIG. 8 is a cross-sectional view of a wiper comprising a third embodiment of the present invention;

FIG. 9A is a bottom view, corresponding to that of FIG. 6, but showing a fourth embodiment of the present invention;

FIG. 9B is a bottom view, corresponding to that of FIG. 6, but showing another embodiment of the present invention.

FIG. 12 is a schematic rendition of a windshield having a pair of wiper arm assemblies for moving a pair of wipers across the windshield, as viewed from the interior of the vehicle on which the windshield is mounted;

FIG. 13 is a schematic view corresponding to that of FIG. 10 but showing an eighth embodiment of the present invention;

FIG. 13A is an end view in elevation of the embodiment of FIG. 13;

DETAILED DESCRIPTION OF THE INVENTION AND PREFERRED EMBODIMENTS THEREOF

Figure 10A:
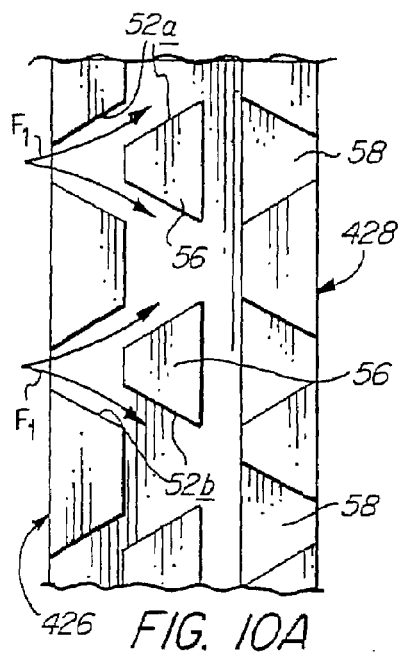
FIG. 10A is a schematic view corresponding to FIG. 10, but showing the wiper in motion to illustrate the flow of water through the leading blade and into and through the channel defined between the blades.

For economy of expression, reference is made below to water as the liquid and to a vehicle windshield as providing the surface which is wiped by the blades of the wiper.

Referring now to FIG. 1, a windshield wiper assembly is generally indicated at 10 and comprises an arm 12, one end of which is mounted on a support head 14, which is a standard item on motor vehicles, and rotates in alternate opposite directions to traverse bridge arm 16 on which is carried a wiper fixture 18. Wiper fixture 18 is carried on bridge arm 16 by a series of clips 20 which retain a wiper 22 which is wiped across the exterior surface S of wind-shield 32.

Referring now to FIG. 2, wiper 22 has a central portion 24 which is connected by neck 24a to head 24b, a first blade 26 and a second blade 28. Neck 24a is formed by a pair of opposite grooves (unnumbered) within which are received opposite arms 20a, 20b of a plurality of clips 20. Clips 20 may be made of any suitable material, such as aluminum, steel or a plastic. In the illustrated embodiment, clips 20, which are formed of steel, and arms 20a, 20b thereof, enclose a longitudinally extending steel strip 21 and a longitudinally extending plastic strip 23. Steel strip 21 serves to space apart arms 20a, 20b when they are crimped about head 24b of wiper 22. Referring now to FIGS. 2, 2A, and 3, blades 26 and 28 each have a middle segment M disposed between a proximal segment P and a distal segment D. Blades 26 and 28 are coextensive with each other and define therebetween a channel 30. First blade 26 has a first, exterior side 26a (FIG. 2) and a second, interior side 26b (FIG. 2A), the latter forming a sidewall of channel 30. Similarly, second blade 28 has a first, exterior side 28a (FIG. 2) and a second, interior side 28b (FIG. 2A), the latter forming the opposite sidewall of channel 30. As best seen in FIG. 2A, first blade 26 has a wiping face 26c and second blade 28 has a wiping face 28c. Wiping faces 26c, 28c contact surface S of windshield 32 and, when wiper 22 is stationary, lie flat against surface S.

First blade 26 has therein a series of formations comprising, in the illustrated embodiment, a series of notches 34 (FIGS. 2 and 3) spaced apart from each other and extending along middle segment M thereof. Second blade 28 has a corresponding series of formations, comprised of notches 36, formed therein and extending along middle segment M thereof. Notches 34 extend from first, exterior side 26a of blade 26 but stop short of second, interior side 26b thereof, leaving an uninterrupted strip of wiping face 26c extending uninterruptedly along second, interior side 26b, as best seen in FIG. 3. Similarly, notches 36 extend from exterior side 28a of second blade 28 but stop short of interior side 28b thereof to leave an uninterrupted continuous strip of wiping face 28c extending along interior side 28b. As best seen in FIG. 2, notches 34 and 36 are cut at an angle to provide a series of openings in, respectively, exterior side 26a of first blade 26 and in exterior side 28a of second blade 28.

The intersection of exterior side 26a and wiping face 26c provides, as shown in FIG. 2, an exterior edge 38a whereas the intersection of interior side 26b with wiping face 26c defines an interior edge 38b. Similarly, the intersection of exterior side 28a of second blade 28 with wiping face 28c provides a second blade exterior edge 40a whereas the intersection of interior side 28b with wiping face 28c provides a second blade interior edge 40b.

Referring now to FIG. 4, wiper 22 is shown in motion as will be occasioned by normal reciprocating motion of windshield wiper assembly 10 (FIG. 1) caused by back-and-forth cyclic rotation of support head 14 (FIG. 1). When wiper 22 is moving in the direction indicated by arrow A (leftwardly as viewed in FIG. 4), first blade 26 is the leading blade while second blade 28 is the trailing blade. As first blade 26 (the leading blade) traverses surface S of windshield 32, it tends to bend or flex so that first exterior side 26a thereof approaches surface S, thus lifting interior edge 38b away from surface S while leaving exterior edge 38a in pressure contact with surface S. Thus when water $W_1$ is encountered, it flows through notches 34 (FIG. 3) and thus through first blade 26 into channel 30 (as shown by arrow $F_1$), where it accumulates as trapped water $W_2$ within channel 30. Trapped water $W_2$ is unable to flow past second blade 28 (the trailing blade) because, as wiper 22 moves in the direction of arrow A, second blade 28 flexes so that continuous interior edge 40b thereof and/or wiping face 28c (FIG. 2A) is in uninterrupted pressure contact with surface S, thus inhibiting or preventing water from flowing under second blade 28. Second blade 28, in its trailing mode, therefore pushes trapped water $W_2$ as wiper 22 continues in the direction of arrow A.

Referring again to FIG. 3, wiper 22 has a distal end 42 and an opposite, proximal end 44. When wiper 22 is installed upon the windshield wiper of a vehicle such as an automobile, truck, aircraft, train, or boat or other watercraft, the travel path of distal end 42 is at or near the top of the windshield, and the travel path of proximal end 44 is at or near the bottom of the windshield. When wiper 22 is in motion in a reciprocating arc travel path (as illustrated in FIG. 12 and described below), distal end 42 will have a greater velocity than proximal end 44. Therefore, the pressure, $P_2$, at distal end 42 will be less than the pressure, $P_1$, at proximal end 44. As a result, when wiper 22 is in motion, the greater pressure $P_1$ will act to push trapped water $W_2$ longitudinally along channel 30 toward distal end 42. Trapped water $W_2$ will accumulate and flow through channel 30 to exit at open distal end 42 thereof, as indicated by arrow $F_2$. This motion-induced pressure differential is a result of the well-known Venturi Effect. The reciprocating movement of wiper 22 through the arc of a circle is also believed to help expel the water through open distal end 42 by centrifugal force. When the vehicle on which windshield wiper assembly 10 is mounted is traveling forward, the air velocity at the top of assembly 10 is higher than the air velocity at the bottom of assembly 10, therefore, the air flowing across the windshield will also help to extract trapped water $W_2$ from the open distal end 42 of channel 30, thereby further enhancing the Venturi Effect.

The reason for omitting the water-passage formations from the distal segment D is that entry of water through such formations has been found to diminish or offset the desired Venturi Effect. Without wishing to be bound by any theory, it is believed that entry of the water into the channel via water-passage formations in the distal segment D may cause turbulence or blockage which offsets the smooth "pumping" action of the Venturi Effect in drawing water from along the middle segment M and proximal segment P of the wiper. It is believed to be less important to omit water-passage formations from proximal segment P but, in some cases, it appears to be advantageous to do so. Again, without wishing to be bound by any theory, it may be that elimination or reduction of water-passage formations in proximal segment P may be useful, especially in very heavy rain downpours, in avoiding the introduction of more water into the channel 30 than can be effectively and efficiently disposed of without pushing water into the cleared area of the adjacent wiper assembly.

When the direction of motion reverses so that wiper 22 is traveling in the direction opposite to that indicated by the arrow A in FIG. 4, second blade 28 becomes the leading blade and flexes to admit water into channel 30 via notches 36 while first blade 26 becomes the trailing blade and it flexes to push trapped water $W_2$ as it travels. The two blades 26, 28 thus allow controlled passage of water, i.e., they allow water to pass through the leading blade but not the trailing blade to flow the water on surface S in one direction from outside wiper 22 into channel 30 and to escape from channel 30 only via distal end 42 thereof. Described differently, the notches 34, 36 behave like valves, allowing water to flow alternately through the notches 34, 36, depending on the direction of movement, and into channel 30 when the wiper 22 moves across the surface S. Water is not permitted to flow back out of the notches 34, 36 but only out of channel 30 via distal end 42 thereof.

While first and second wiper blades 26 and 28 are illustrated as being parallel to each other, they may be at a slight angle to one another. First and second wiper blades 26 and 28 are illustrated as being relatively wide, with well-defined wiping faces 26c and 28c. However, the present invention is not limited to wide wiper blades having wiping faces, and may be used with narrow wiper blades having only a wiping edge or wiper blades having a triangular or any other suitably shaped cross section.

FIGS. 5, 6 and 7 illustrate another embodiment of the present invention. Wiper 122, having a length L, has a central portion 124, a neck 124a, a head 124b, a first blade 126 having an exterior side 126a and an interior side 126b, and second blade 128 having an exterior side 128a and an interior side 128b. First blade 126 and second blade 128, having a middle segment M disposed between a proximal end segment P and a distal end D, are disposed relative to each other to define a longitudinal channel 130 therebetween. Instead of notches, the formations of first blade 126 comprise protrusions 134 along its middle segment M at the exterior edge 138a thereof. Second blade 128 likewise has protrusions 136 along its middle segment M at exterior edge 140a thereof. "At" in this context has its usual meaning of on, near or by, and indicates that the protrusions are sufficiently close to the exterior edges 138a, 140a of the blades 126, 128 to contact the windshield 32 when the respective blade is a leading blade, as described below. First blade 126 has a wiping face 126c and an exterior side 138a formed at the intersection of wiping face 126c and exterior side 126a. First blade 126 further has an interior edge 138b formed at the intersection of wiping face 126c and interior side 126b. Second blade 28 similarly has a wiping face 128c, which, at its respective intersections with exterior side 128a and interior side 128b, forms exterior edge 140a and interior edge 140b. When wiper 122 is at rest, wiping faces 126c and 128c make contact with, and lie flat against, surface S of windshield 32.

FIG. 7 illustrates wiper 122 in motion in the direction of arrow A. Referring to FIGS. 6 and 7, first blade 126 (the leading blade) flexes to bring protrusions 134 thereof to bear on surface S which lifts first, exterior edge 138a out of contact with surface S. The raising of exterior edge 138a allows water $W_1$ to enter channel 130 under first blade 126 via the spaces between protrusions 134 (i.e., to "pass through" the blade), as shown by arrow $F_1$. Protrusions 136 of second blade 128 (the trailing blade), however, do not contact surface S when wiper 122 is moving in this direction. Instead, second blade 128 flexes so that second, interior edge 140b contacts surface S so that second blade 128 accumulates trapped water $W_2$ in channel 130 (i.e., blade 128 "inhibits" water from passing therethrough). Thereafter, trapped water $W_2$ may flow out of an open distal end 142 (FIG. 6) in the same manner as illustrated in FIG. 3. When the direction of travel of wiper 122 is reversed, the functions of the blades are similarly reversed in the manner described above for the embodiment of FIGS. 1–4. Controlled passage of water is thus achieved in a manner similar to the embodiment of FIGS. 1 through 3.

Blades 126 and 128, like blades 26 and 28, are integrated unitary bodies of a suitable flexible material, such as natural or synthetic rubber or other suitable elastomer, in which the pairs of wiper blades are joined by a central portion 124 formed integrally therewith in a body which has an "up-side down U" cross section. In an alternative embodiment of the invention, the wiper blades may also be mechanically mounted side by side in a blade carrier 50 as is known in the art and illustrated in FIG. 8. Wiper 222 has first blade 226 having an exterior side 226a, interior side 226b and a wiping face 226c. Second blade 228 has an exterior side 228a, an interior side 228b and a wiping face 228c. A channel 230 is formed between blades 226 and 228.

In this embodiment, controlled passage of water is achieved using a material having a low coefficient of friction, e.g., a fluoropolymer, such as that available commercially under the trademark TEFLON from E.I. DuPont de Nemours and Company, of Wilmington, Delaware, or equivalent material. First blade 226 has along a middle segment thereof a layer 46 and second blade 228 has along a middle segment thereof a layer 48 of a material having a coefficient of friction which is significantly lower than that of the remainder of blades 226 and 228. Layers 46 and 48 may be comprised partially or wholly of polytetrafluoroethylene ("PTFE"); accordingly, layers 46 and 48 are referred to below as "PTFE layers" 46, 48, although suitable materials other than PTFE may be employed. The remainder of the blades 226, 228 may be made of any suitable materials, such as any suitable polymeric or elastomeric material. First and second blades 226 and 228 of wiper 222 are held by blade carrier 50. Blade carrier 50 may be made of any suitable material, such as a suitable metal or plastic having sufficient strength for the purpose, and may be manufactured by extrusion, milling or other methods.

The PTFE layers 46 and 48 may be coated onto first and second blades 226, 228 or they may comprise inserts bonded onto the blades as illustrated in FIG. 7, or they may be applied by any other suitable means. PTFE layers 46 and 48 may comprise a larger or smaller portion of the cross section of the blades 226, 228, anything from a thin coating to constituting a majority of thickness of the blades. When the first blade 226 flexes in a first direction, as would be caused by movement of wiper 222 in the direction indicated by arrow A in FIG. 8, the PTFE layer 46 remains in contact with the surface S of windshield 32 and the interior edge 226b of blade 226 is lifted away from the surface S. Such movement leftward will cause the second blade 228 to flex leftwardly as viewed in FIG. 8, lifting the PTFE layer 48 away from the surface S and having at least the interior edge 240b of second blade 228 remaining in contact with the surface S. When the wiper moves in the opposite direction, blade 228 flexes in the opposite direction from that shown for blade 128 in FIG. 7, and the situation is reversed, i.e., PTFE layer 48 is brought into contact with surface S and PTFE layer 46 is lifted away from surface S.

Without wishing to be bound by any particular theory, it is believed that this embodiment may function as a result of the low coefficient of friction of the PTFE layers 46 and 48 and, possibly, the suction exerted on first blade 226 (and the water under it) by low pressure within channel 230 induced by air velocity therethrough. When wiper 222 moves in a first direction across surface S, as indicated by arrow A in FIG. 8, water passes underneath first blade 226 at PTFE layer 46. Water is trapped in channel 230 by the interior edge 240b (having no PTFE constituent) of the second blade 228. When wiper 222 moves in a second direction opposite to the direction indicated by arrow A, the operation is reversed.

FIG. 9A illustrates a wiper 322 having first blade 326 and second blade 328 defining therebetween a channel 330. First blade 326 has passages 334 extending therethrough. Unlike the embodiments disclosed previously, passages 334 are continuously open to flow of water therethrough as they penetrate first blade 326 and are open to fluid flow, regardless of whether first blade 326 flexes or wiper 322 is moving in the direction of arrow A or in the opposite direction.

When wiper 322 is moving laterally across a surface in the direction shown by arrow A, water will pass through first blade 326 via passages 334 and enter channel 330, where it will be trapped by second blade 328. Such trapped water will be held within channel 330 and be unable to escape through passages 334 because of the motion of wiper 322 in the direction indicated by arrow A and the entrance of additional water through passages 334. As discussed above with reference to other embodiments, the trapped water is discharged from wiper 322 via an open distal end 342 thereof. When wiper 322 is moving in the direction opposite to that indicated by the arrow A, it operates as a conventional wiper because second blade 328 traps and pushes water away without admitting the water into channel 330. This embodiment illustrates that one blade of a dual-blade wiper in accordance with an embodiment of the invention may be a conventional wiper blade 328, i.e., one without water-flow formations therein. In this particular embodiment, having one blade (326) allowing passage of water therethrough and one conventional blade (328) permits passage of water through the leading blade and into the channel 330 when the wiper moves in one direction only.

A further embodiment of the wiper 322 is shown in FIG. 9B. The wiper 322', shown by bottom view, has a first blade 326' having an interior side 226b'. The second blade 328' has an interior side 228b'. The interior sides 226b' and 228b' are not parallel as compared to the embodiment of FIG. 9A but diverge at an angle α so that a proximal end 344' of the wiper 322' has an opening 800 that is smaller than an opening 802 in a distal end 342' of the wiper 322'. As the water enters into the channel 330', the increasing size of the channel 330' in the direction of the distal end 342' will allow additional water to flow out the opening 802 since the movement of the wiper 322' causes the Venturi (and centrifugal) forces to act in that direction. If a sufficient amount of water is collected in the lower part of the wiper 322', this will block other water at the top from entering into the channel 330' through the passages 334'. Having the cross-sectional area of channel 330' increase in size as sensed moving towards the opening 802 will allow additional water to be removed. The size of the angle will depend on several factors: the reciprocation speed of the wipers, the location of the passages 334' along a middle segment of the blades, whether the passages are uniform or varied, the rate of rainfall, the height of the sides 226b', 228b', and the length L of the wiper 322'.

Figure 10:
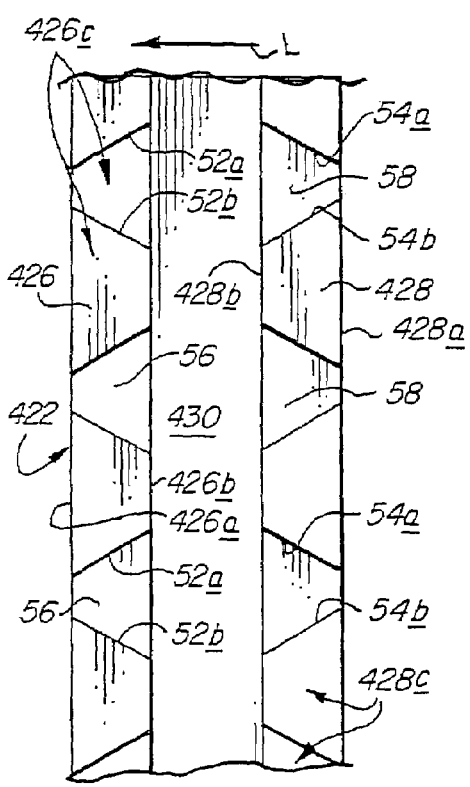
FIG. 10 is a bottom view, corresponding to that of FIG. 9A, but showing a fifth embodiment of the present invention.

FIG. 10 illustrates a wiper 422 having first blade 426 and second blade 428 defining a channel 430 therebetween. First blade 426 has angled slits 52a, 52b formed therein across a wiping face 426c thereof, and second blade 428 has angled slits 54a, 54b formed therein across a wiping face 428c thereof. The slits are of a height less than the height of the blades 426 and 428. The angled slits are arranged in pairs; each pair of angled slits 52a, 52b is arranged so as to be closer together at exterior side 426a and further apart at interior side 426b of first blade 426, so that each pair of angled slits 52a, 52b defines therebetween a wedge-shaped flap member 56 in first blade 426. Angled slits 54a, 54b of second blade 428 provide similar wedge-shaped flap members 58 which are wider at interior edge 428b than at exterior edge 428a. Wedge-shaped flap members 56 and 58 are connected to their respective blades 426, 428 at the upper ends of, respectively, slits 52a, 52b and 54a, 54b. (The upper ends of the slits are the ends remote from wiping faces 426c, 428c.)

When wiper 422 moves across a windshield surface or the like in the direction indicated by arrow A, blade 426 flexes in that flap members 56 are pushed away from blade 426 by frictional forces engendered by contact with the windshield, thus opening or widening angled slits 52a, 52b and allowing water to enter channel 430, as shown by arrows $F_1$ in FIG. 10A. (The schematic rendition of FIG. 10A is equivalent to a longitudinal cross-sectional view taken below the full height of slits 52a, 52b, and 54a, 54b so that the material connecting wedge-shaped flap members 56 to first blade 426 are not visible.) The slits are high enough, i.e., extend far enough away from the wiping faces 426c, 428c to permit the illustrated shifting of flap members 56 (FIG. 10A) and similar shifting of flap members 58 when wiper 422 moves across the windshield in the direction opposite to that indicated by the arrow A in FIG. 10. As to flap members 58 of second blade 428, the frictional forces engendered by motion of wiper 422 in the direction of arrow A in FIG. 10 press flap members 58 firmly against blade 428 thereby closing angled slits 54a, 54b of second blade 428. Thus, water is trapped by second blade 428 within channel 430 (FIG. 10), and wiper 422 functions as described previously in connection with the other embodiments to divert water from the windshield and discharge it via a distal end 442 (FIG. 10) of wiper 422. When wiper 422 moves in the direction opposite to that indicated by arrow A, flap members 56 are closed and flap members 58 are opened, and water flow passes through second blade 428 into channel 430.

Figure 11:
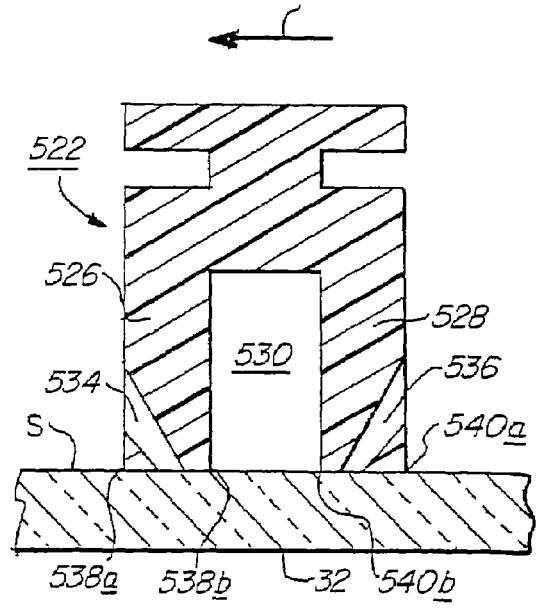
FIG. 11 is a transverse cross-sectional view corresponding to that of FIG. 5 but showing a sixth embodiment of the present invention.

In FIG. 11, wiper 522 has first blade 526 and a second blade 528 defining there-between a channel 530. First blade 526 has an exterior edge 538a and an interior edge 538b; second blade 528 has an exterior edge 540a and an interior edge 540b. Water-flow formations 534 on first blade 526 and formations 536 on second blade 528 comprise apertures or holes rather than notches but otherwise function identically to the notches of the embodiment of FIGS. 1 through 3 to control water passing through the blade. When moving in the direction indicated by the arrow A the flexing of the blade 526 will bring the angled passages 534 closer to the surface S of windshield 32 thereby permitting water on the surface S to flow through the passages 534 into channel 530 for discharge from an open distal end (not shown in FIG. 11) of the channel. Flexing of the trailing second blade 528 will keep the interior edge 540b of second blade 528 in contact with the surface S and prevent the flow of water therethrough. When wiper 522 moves in the direction opposite from that indicated by the arrow A, the reverse water flow will occur in a manner similar to that described above with respect to the other embodiments.

Referring now to FIG. 12, there is shown a windshield 132 of a vehicle as viewed from the interior of the vehicle so that windshield wiper assembly 110 is on the driver's side (of a U.S. style left hand steering wheel vehicle) or the pilot's side, and windshield wiper assembly 210 is on the passenger's or co-pilot's side. Windshield 132 has opposite side edges 132a, 132b. Windshield wiper assembly 110 is driven by support head 114 and windshield wiper assembly 210 is driven by support head 214. As is conventional, windshield wiper assemblies 110 and 210 reciprocate in the direction indicated by the double-headed arrows to generate arc-shaped respective cleared areas 60, 62. In a preferred arrangement, windshield wiper assemblies 110 and 210 will utilize respective wipers 22a and 22b which are of dual-blade construction and have therein formations as described above, e.g., in connection with the embodiment of FIGS. 1–4, so that the deposit of displaced water by wiper 22a into the cleared area 62 of windshield wiper assembly 210 is eliminated or at least significantly reduced, and the deposit of displaced water into the cleared area 60 of windshield wiper assembly 110 is similarly eliminated or at least significantly reduced. Conventional windshield wipers would deposit water into the cleared areas 60, 62 of the other wiper assembly as indicated by the arrows Wc in FIG. 12. The windshield wipers would thus be working against each other. If both wipers 22a and 22b are wipers in accordance with an embodiment of the present invention, water will be discharged from the distal end of the channels (not shown in FIG. 12) of wipers 22a and 22b as indicated by the arrows Wd and will be discharged to the left and right of windshield 132 as indicated by the arrows Wr.

In the arrangement of FIG. 12, in order to reduce or eliminate water being pushed by wiper assembly 210 in the direction shown by arrows Wc onto the driver's cleared area 60, the water passage formations should be formed in at least the middle segment of the inside blade 12 of wiper assembly 210. In order to reduce or eliminate pushing water in the direction of arrows Wc into cleared area 62 on the passenger side, water-passage formations should be formed in at least the middle segment of the inside blade $I_1$ of wiper assembly 110. As noted above, it is the inside blades 11 and 12 which are defined as the "first" blades in claims which define first and second blades of the wiper of the present invention.

For practices of the invention therefore, the water-passage formations need be supplied only on the inside blades and only on the passenger or co-pilot wiper assemblies. However, it is convenient to provide the water-passage formations in both blades in order to simplify installation and to avoid the need for keeping in stock differently configured wiper assemblies. It is also desirable to provide the water-passage formations at least in the inside blade of the driver or pilot wiper assembly, in order to enhance the visibility through the windshield of the passenger or co-pilot.

Referring now to FIGS. 13 and 13A, there is shown a three-blade embodiment of the present invention. A wiper 722 has a central portion 724, a neck 724a and a head 724b. As best seen in FIG. 13, first blade 726 has a series of notches 734 formed along its middle segment at the exterior edge 738a thereof and second blade 728 has a series of notches 736 formed along its middle segment at the exterior edge 740a thereof. First blade 726 and second blade 728 form therebetween a channel 730. An intermediate blade 27 is disposed between, spaced from, and substantially parallel to first blade 726 and second blade 728. First blade 726, second blade 728 and intermediate blade 27 have respective wiping faces 726c, 728c and 27c. Notches 734 and 736 extend into, respectively, wiping faces 726c and 728c, as in the embodiment of FIGS. 2, 2A, 3 and 4. Intermediate blade 27 divides channel 730 into a first course 30a and a second course 30b, courses 30a and 30b being disposed substantially parallel to each other. The operation of wiper 722 is substantially similar to that described above in connection with the embodiment illustrated in FIGS. 2, 2A, 3 and 4, except that water which flows through passages 734 is constrained to flow only through course 30a. This is because, in the illustrated embodiment, intermediate blade 27 has no formations formed therein to permit the passage of water therethrough. Consequently, wiping face 27c will remain pressed against the water-containing surface and will therefore constrain water admitted into course 30a to flow therein, to exit from a top end (not shown). Water which passes through perforations 736 is similarly constrained by intermediate blade 27 to flow through course 30b of channel 730.

Figure 14:
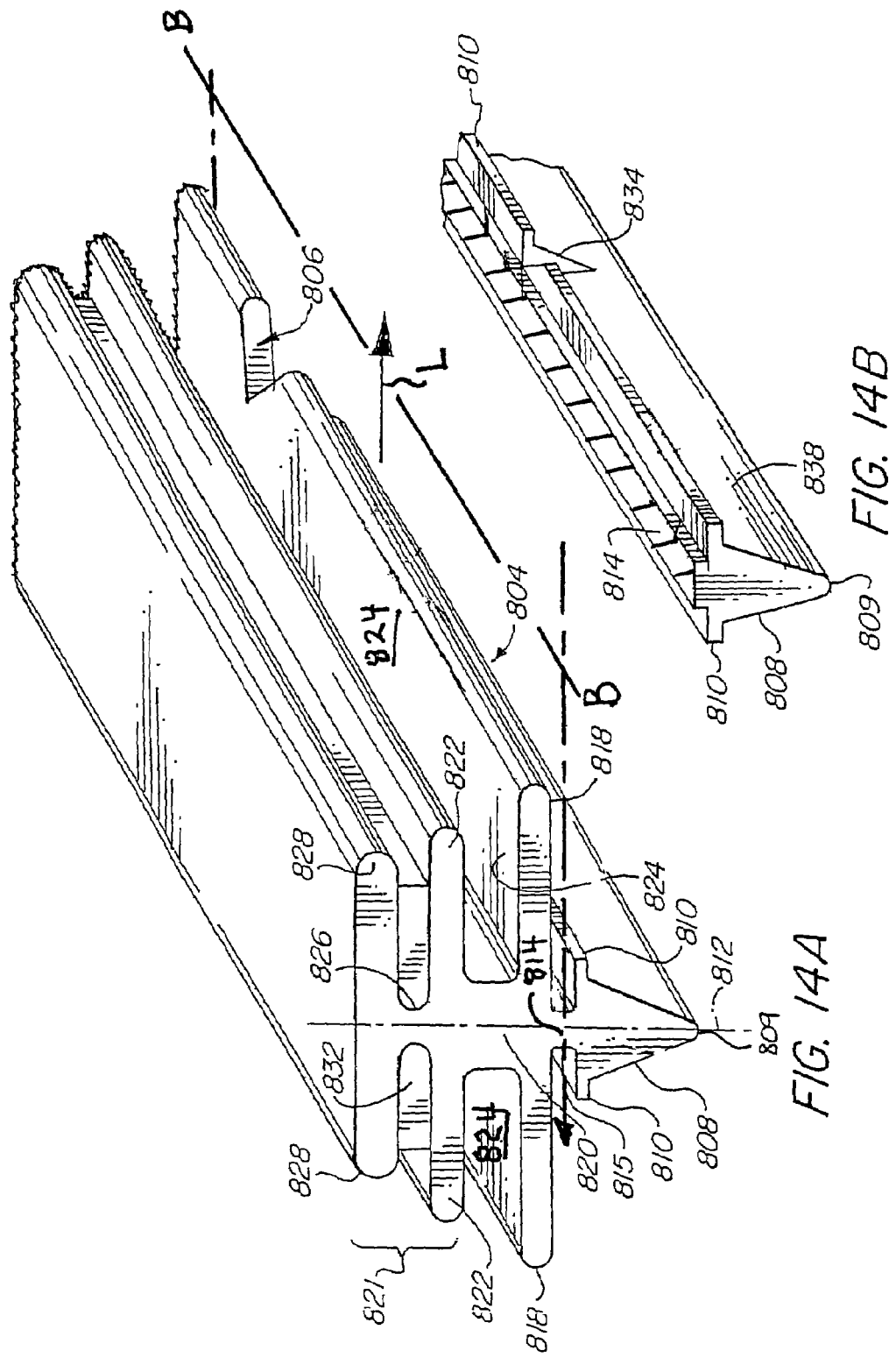
FIG. 14A is a perspective partial view of a wiper blade having notched edges in accordance with another embodiment of the present invention.
FIG. 14B is a perspective view of a segment of the wiper blade of FIG. 14A taken along line B—B thereof.

FIG. 14A provides a perspective view, and FIG. 14B a perspective view with part removed, of a known BOSCH Micro Edge® wiper, model 40718A, modified in accordance with the present invention by the addition of a plurality of notches 806, 834 (FIG. 14B) to provide a wiper 804 according to another embodiment of the present invention. The wiper 804 has a single primary blade 808 of generally triangular cross-sectional shape. Primary blade 808 terminates in a wiping face 809 and has a first pair of narrow secondary blades 810 respectively extending from opposite sides of primary blade 808. Secondary blades 810 are positioned sufficiently close to wiping face 809 to bring one of the first pair of secondary blades 810 into, or nearly into, contact with the windshield as blade 808 flexes during its passage over the windshield. First pair of secondary blades 810 are essentially perpendicular to a vertical center line 812 of the cross section of the wiper 804. Directly above the first pair of secondary blades 810 is a first neck 814 which is narrower than the top of primary blade 808, as best seen in FIG. 14B. Wiper 804 further comprises a second pair of secondary blades 824 which also are essentially perpendicular to vertical center line 812 and provide additional lateral wiping edges 818. The second pair of secondary blades 824 are of substantially greater width than the first pair of secondary blades 810. A pair of first channels 815 (FIGS. 14A and 14B) are formed between the first pair of secondary blades 810 and the second pair of secondary blades 824.

The lower support deck 822 is connected by a third neck 826 to an upper support deck 828 to form a first pair of channels (unnumbered) between decks 822 and 828, into which channels metal support rails 832 are inserted on both sides of the third neck 826. Neck 820 separates lower support deck 822 from the second pair of secondary blades 824 to define there-between a second pair of channels 825 (FIG. 14A) into which blade-holding clips, not shown, of a wiper arm, not shown, are positioned. The arrangement of such wiper arm and clips would be generally similar to that of wiper arm 12, bridge arm 16 and clips 20 of FIG. 1. Channel 825 also provides a longitudinal conduit for the diversion of water. The support rails 832 provide substantial rigidity to the wiper 804 in the direction perpendicular to the vertical line 812 and are also firmly held in place by the wiper arm clips, not shown.

The notches 806, 834 or other equivalent formations provided in this embodiment, have the same placement and function as the notches or other formations described in connection with the other embodiments of the invention. Thus, the notches or other formations are present in the middle segment of the blade and excluded from the distal segment and, preferably, excluded from a proximal segment as well.

Referring to FIG. 14B, notch 834 is typical of a series of such notches (not shown) formed at the secondary blades 810 and into a sidewall of the blade 808. Optionally, notches such as notch 834 may be on one or both sides of wiper 804 and have a variety of spacing patterns along the wiper, consistent with the above-described requirements for placement of the notches (or other water-passage formations) in a middle segment of the blade, and exclusion of the notches from at least the distal segment of the blade. As seen in FIG. 14A, a typical notch 806 of a series of such notches is made in the lateral wiping edges 818 of one or both of the second pair of secondary blades 824. Notches such as notch 806 (or other water-passage formations) may also be formed in one or both of the first pair of secondary blades 810 (FIG. 14B). The notches need not be triangular-shaped as shown, but may be of any suitable shape such as half circles, rectangles, etc. Neck 814 provides a channel 815 between secondary blades 810 and 824 through which the water flows along the length of wiper 804 as it moves. A second neck 820 connects the water-diverting lateral edges 818 to the mounting portion 821 of the wiper. Mounting portion 821 comprises lower support deck 822, upper support deck 828 and support rails 832.

In use, the leading one of the first pair of secondary blades 810 will, because of flexing of blade 808, make contact with, or be nearly in contact with, the surface of the wind-shield when the wiper 804 moves in one direction, to effectively form a longitudinal channel between primary blade 808 and the leading one of the first pair of secondary blades 810. When the wiper 804 moves in the opposite direction, the other one of the first pair of secondary blades 810 is the leading one and will make contact with, or nearly be in contact with, the surface of the windshield to similarly effectively form a longitudinal channel between primary blade 808 and the leading one of the first pair of secondary blades 810. Frictional engagement of wiping face 809 with the surface of the windshield will tend to flex the primary blade 808 and leading secondary blade in one direction or the other, depending upon the direction of travel of the wiper.

In operation, wiping face 809 is in contact with the windshield regardless in which of the two directions of movement the wiper 804 is moving. Wiping face 809 is thus direction-independent in use. Neck 814 is thin enough to allow blade 808 to flex from the vertical line 812 as wiper 804 is drawn across the windshield in a given direction and, when it so flexes, the leading one of first pair of secondary blades 810 contacts or nearly contacts the windshield, as does wiping face 809. When primary blade 808 is thus flexed, a lateral wiping edge of the leading one of the second pair of secondary blades 824 may also contact the windshield, or may be positioned close enough to the windshield to be able to move water even without contact with the windshield. When wiper 804 moves in the opposite direction, the other one of the first pair of secondary blades 810 and the other one of the second pair of secondary blades 818 touch or approach the windshield closely enough to move water across it.

Notches 806 and/or 834 increase the removal rate of water by providing access to channels 815 and 825, along which the water may flow towards one end of the blade or the other as the wiper moves across a windshield so that the water can be expelled from the end of the wiper.

Figure 15:
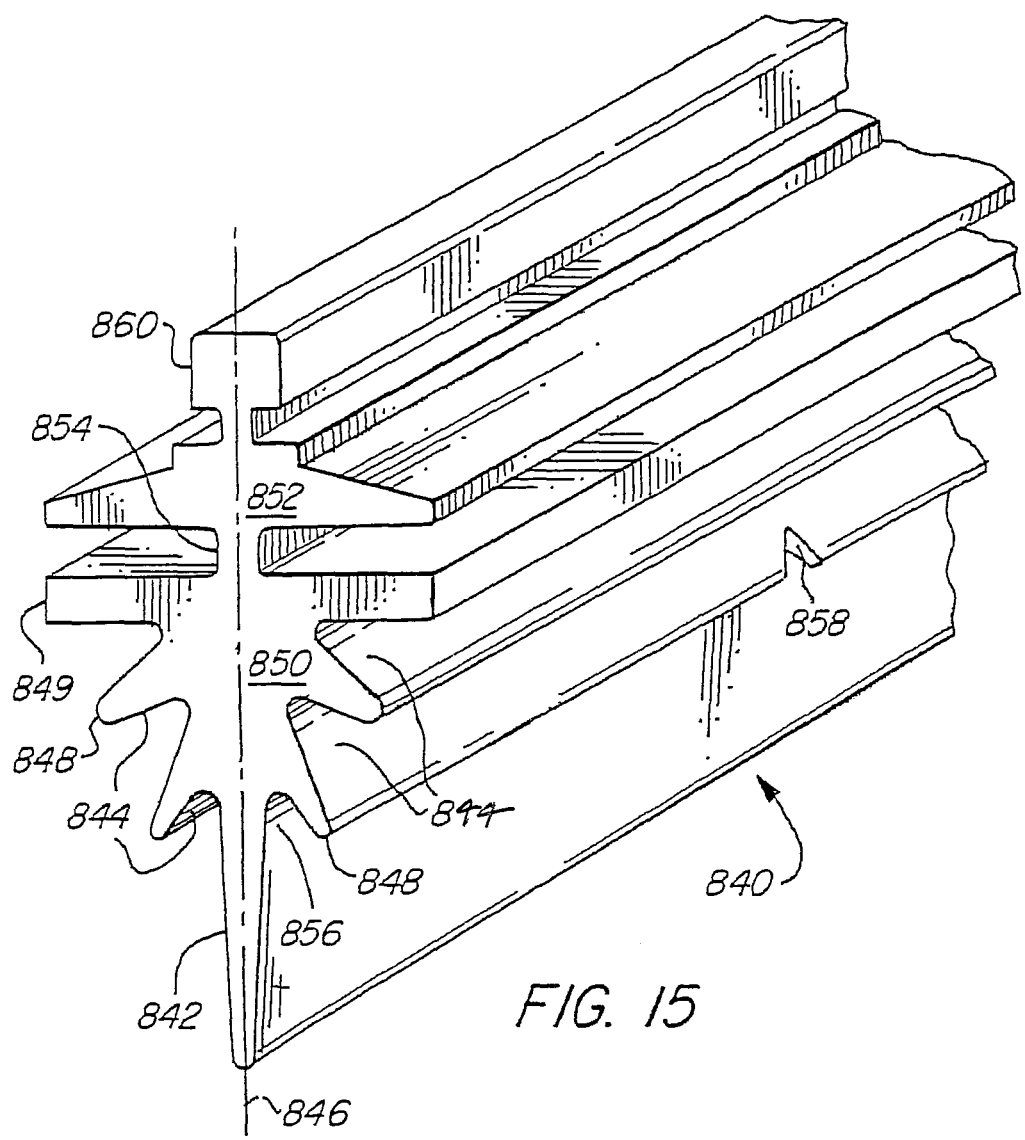
FIG. 15 illustrates by perspective view another wiper blade having a plurality of angled secondary blades with notched edges in accordance with another embodiment of the present invention.

Referring to FIG. 15, a multi-blade wiper 840 in accordance with the present invention is shown. Wiper 840 is a modification of a known wiper sold under the trademark "MAGIC WIPER"™ by the Magic Wiper Company. The modification to provide an embodiment of the present invention is that a series of water-passage formations are formed in one or more of the blades. The placement of these water-passage formations, e.g., notches, is as described above, i.e., the notches (or equivalent water-passage formations) are positioned in the middle segment of the blade. At least the distal segment, and preferably both the distal and proximal segments of the blade, are free of such notches or other water-passage formations. Wiper 840 comprises a primary blade 842 which is vertically oriented and serves to trap most of the water as it moves across the windshield surface. Line 846 is a vertical center line of the cross-section of wiper 840. Secondary blades 844 provide additional lateral wiping edges 848 and are angled from the vertical line 846 from about 30° to less than 90°, and have a length such that at least one lateral wiping edge 848 will contact the windshield when the primary blade 842 flexes away from the vertical, in the direction opposite the direction of movement of multi-blade wiper 840. A series of notches similar to illustrated notch 858 is formed in one or more of blades 844. This flexing is further aided by having a base area 850 of wiper 840 connected to an upper area 852 by means of a thin, flexible neck 854. Water-diverting lips 849 are located directly above the secondary blades 844. A head 860, which runs the full length of the wiper 840, is enclosed in a housing or blade carrier, not shown, and this provides the necessary rigidity to mount blade 840 to a wiper arm, not shown. Such housing is configured to receive clips for attachment to a bridge arm like bridge arm 16 of FIG. 1. A series of water-passage formations identical or similar to notch 858 may be placed in one or more of the secondary blades 844 to aid in the water removal as discussed in relation to the above-described embodiments.

Figure 16:
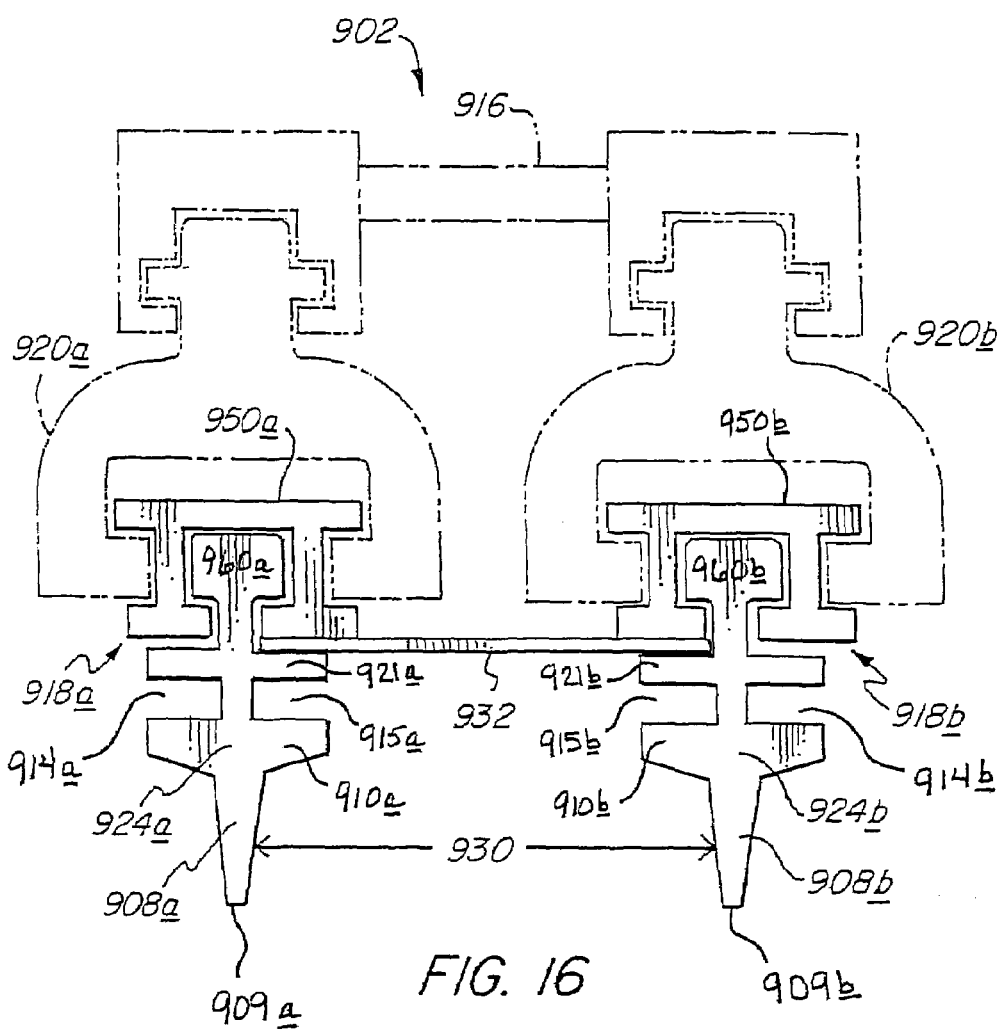
FIG. 16 is a schematic cross-sectional view of a dual-wiper bridge arm assembly according to still another embodiment of the invention.

Still another embodiment of the invention provides an improvement in a windshield wiper assembly having two separate wiper assemblies carried side by side, preferably on the same bridge arm, providing side-by-side wiper blades, as illustrated in FIG. 16. The improvement is that at least one of the blades is equipped with a series of notches or other water-flow formations configured and placed along the length of the blade as described above with respect to other embodiments of the invention. When such notches or other formations are employed, the windshield wiper assembly of this embodiment is analogous to the embodiment of FIG. 9A. The embodiments of FIG. 16 finds special utility when used in combination with a second windshield wiper assembly where the wiping regions of the two overlap (e.g., a driver-side assembly and a passenger-side assembly).

A bridge arm assembly illustrating this embodiment of the invention is shown in FIG. 16. Bridge arm assembly 902 comprises a bridge arm 916 for attachment to a wiper arm such as arm 12 of FIG. 1. Bridge arm assembly 902 carries two wiper assemblies 918a, 918b, each mounted on bridge arm 916 by one or more clips 920a, 920b. In the illustrated embodiments, wiper assembly 918a is similar in configuration to wiper assembly 918b, so they will be described together except to the extent that one differs from the other. Each wiper assembly 918a, 918b comprises a wiper 924a, 924b having a head 960a, 960b formed above a retaining flange 921a, 921b. A blade carrier 950a, 950b is dimensioned and configured to receive head 960a, 960b to provide sufficient rigidity to the wiper assembly and to facilitate attachment to bridge arm 916 via clip 920a, 920b and other clips (not shown).

Below retaining flanges 921a, 921b, wipers 924a, 924b define channels 914a, 915a and 914b, 915b, beneath which extend the blades 908a, 908b having principal edges 909a, 909b and lateral edges 910a, 910b. Wiper assembly 918b is positioned substantially parallel to wiper assembly 918a. When bridge arm assembly 902 is disposed against a windshield, a channel 930 is formed between blades 908a and 908b. As previously mentioned, one of blades 908a and 908b comprises a plurality of notches to permit water to flow therethrough.

FIG. 16 also shows a containment strip 932 which extends from wiper assembly 918a to wiper assembly 918b and which encloses channel 930. Preferably, strip 932 resides in a region in which blade 908a or 908b is provided with water-passage formations, e.g., notches, not shown in FIG. 16. In use, the water-passage formations on the outside blade and strip 932 cooperate to reduce the degree to which bridge arm assembly 902 would work against the wiping function of an adjacent windshield wiper assembly in the region of overlap by depositing water there.

The configuration, selection, size, orientation, and number of the passages, apertures, slits or other formations may easily be selected to suit the particular working environment. Various combinations of notches, passages, protrusions and flap members may be used on one blade. In addition, the channel between the blades may be segmented into two channels, one channel communicating with a respective end of the wiper.

While the invention has been described in detail with reference to particular embodiments thereof, it will be apparent that upon a reading and understanding of the foregoing, numerous alterations to the described embodiments will occur to those skilled in the art and it is intended to include such alterations within the scope of the appended claims.

What is claimed is:

1. A wiper for wiping liquid from a surface, the wiper having a length L, a proximal segment terminating in a proximal end, a distal segment terminating in a distal end, and a middle segment extending between the proximal and distal segments, each of the segments having a respective length and the length L of the wiper being defined by the sum of the respective lengths of the proximal, middle and distal segments, the wiper comprising:

a first blade and a second blade disposed relative to each other to define a longitudinal channel therebetween, the longitudinal channel being open at least at the distal end of the wiper, the middle segment being at least 0.35 L in length, at least the first blade having therein one or more formations disposed along the middle segment thereof and excluded from the distal segment thereof, which formations are configured: (a) to permit the passage of liquid through the first blade into the channel when the wiper moves across such surface in a first direction, and (b) to inhibit passage of liquid through the first blade from the channel when the wiper moves across such surface in a second direction opposite to the first direction, and wherein the distal segment is at least about 0.05 L in length.

2. The wiper of claim 1 wherein the distal segment is from about 0.05 L to 0.15 L in length.

3. The wiper of claim 1 wherein the formations are excluded from the proximal segment.

4. The wiper of claim 1, claim 2 or claim 3 wherein the second blade has therein one or more formations disposed along the middle segment thereof and excluded from the distal segment thereof, which formations are dimensioned and configured (a) to permit the passage of liquid through the second blade into the channel when the second blade moves across such surface in the second direction and (b) to inhibit the passage of liquid through the second blade from the channel when the second blade moves across such surface in the first direction.

5. The wiper of claim 1, claim 2 or claim 3 further comprising at least one intermediate blade disposed between the first and second blades to divide the channel longitudinally into first and second courses.

6. The wiper of claim 5 wherein the intermediate blade is dimensioned and configured to inhibit the passage of liquid therethrough, whether the wiper is moving in the first direction or the second direction, whereby liquid which passes through the first blade is constrained to flow along the first course and liquid which passes through the second blade is constrained to flow along the second course.

7. The wiper of claim 1, claim 2 or claim 3 comprising a plurality of secondary blades having formations thereon along the middle segment thereof.

8. The wiper of claim 3 wherein the proximal segment is from about 0.4 to 0.5 L in length.

9. A wiper for wiping liquid from a surface, the wiper having a length L, a proximal segment terminating in a proximal end, a distal segment terminating in a distal end, and a middle segment extending between the proximal and distal segments, each of the segments having a respective length and the length L of the wiper being defined by the sum of the respective lengths of the proximal, middle and distal segments, the wiper comprising:

a first blade and a second blade disposed relative to each other to define a longitudinal channel therebetween, the longitudinal channel being open at least at the distal end of the wiper, the middle segment being at least 0.35 L in length, at least the first blade having therein one or more formations disposed along the middle segment thereof and excluded from the distal segment thereof, which formations are configured: (a) to permit the passage of liquid through the first blade into the channel when the wiper moves across such surface in a first direction, and (b) to inhibit passage of liquid through the first blade from the channel when the wiper moves across such surface in a second direction opposite to the first direction, and wherein the proximal segment is from about 0.4 L to about 0.5 L in length, the distal segment is from about 0.05 L to about 0.15 L in length, and the middle segment is from about 0.35 L to about 0.55 L in length.

10. A wiper for wiping liquid from a surface, the wiper having a length L, a proximal segment terminating in a proximal end, a distal segment terminating in a distal end, and a middle segment extending between the proximal and distal segments, each of the segments having a respective length and the length L of the wiper being defined by the sum of the respective lengths of the proximal, middle and distal segments, the wiper comprising:

a first blade and a second blade disposed relative to each other to define a longitudinal channel therebetween, the longitudinal channel being open at least at the distal end of the wiper, the middle segment being at least 0.35 L in length, at least the first blade having therein one or more formations disposed along the middle segment thereof and excluded from the distal segment thereof, which formations are configured: (a) to permit the passage of liquid through the first blade into the channel when the wiper moves across such surface in a first direction, and (b) to inhibit passage of liquid through the first blade from the channel when the wiper moves across such surface in a second direction opposite to the first direction, and wherein the cross-sectional area of the longitudinal channel increases as sensed moving in the direction toward the distal end.

11. A wiper for wiping liquid from a surface, the wiper having a length L, a proximal end and a distal end and comprising: a first blade and a second blade disposed relative to each other to define a longitudinal channel therebetween and having a middle segment disposed between a proximal segment which terminates at the proximal end and extends to one end of the middle segment, and a distal segment which terminates at the distal end and extends to the other end of the middle segment, the longitudinal channel being open at the distal and proximal ends of the wiper, the distal segment being at least 0.05 L in length, the middle segment being at least 0.35 L in length and the proximal segment being at least 0.4 L in length, each blade being flexible and having therein a plurality of formations disposed along the middle segment thereof and excluded from the distal segment thereof, which formations are configured: (a) to permit the passage of liquid through the first blade into the channel and inhibit passage of liquid through the second blade from the channel when the wiper moves across such surface in a first direction, and (b) to inhibit passage of liquid through the first blade and permit passage of liquid through the second blade when the wiper moves across such surface in a second direction opposite to the first direction, the wiper being dimensioned and configured to be mountable on a reciprocating support head to bear against a windshield and to reciprocatingly move relative thereto so as to generate an arc-shaped cleared area on the windshield, with the distal end defining a larger arc than the proximal end.

12. The wiper of claim 11 wherein the formations are excluded from the proximal segment of the first and second blades.

13. The wiper of claim 11 further comprising at least one intermediate blade disposed between the first and second blades to divide the channel longitudinally into first and second courses.

14. The wiper of claim 12 wherein the intermediate blade is dimensioned and configured to prevent the passage of liquid therethrough, whether the wiper is moving in the first direction or the second direction, whereby liquid which passes through the first blade is constrained to flow along the first course and liquid which passes through the second blade is constrained to flow along the second course.

* * * * *